3,053,854
PURIFICATION OF PHTHALIC ANHYDRIDE
Alfred Saffer, Bayside, N.Y., assignor to Scientific Design Company, Inc., New York, N.Y., a corporation of Delaware
No Drawing. Filed June 4, 1959, Ser. No. 817,983
2 Claims. (Cl. 260—346.4)

This invention relates to the purification of phthalic anhydride and more particularly relates to an improved process for the removal of color forming bodies from phthalic anhydride.

One of the important problems involved in the production of phthalic anhydride, is the removal of minute quantities of color forming impurities. In the present state of the art, phthalic anhydride may be produced by oxidizing naphthalene or ortho-xylene to form a gaseous effluent which upon condensation gives good yields of phthalic anhydride. While this method is effective as far as yields are concerned, the phthalic anhydride product contains small but difficult to remove quantities of color forming impurities, such as naphthaquinone. The present practice of removing these minute quantities of color forming bodies from phthalic anhydride by prolonged heat treatment of the crude phthalic anhydride melt in the presence of various chemical additives, followed by distillation is not always reliable.

It is, therefore, an important object of the present invention to provide a simple, inexpensive and effective method for substantially eliminating the color forming bodies anhydride without the introduction of undesirable elements.

Another object of the invention is to provide phthalic anhydride of improved quality which is substantially free from the effects of color producing impurities.

According to the broad aspects of the invention, a gaseous effluent of phthalic anhydride containing color forming bodies, such as naphthaquinone, is catalytically reacted with molecular oxygen or other materials capable of converting the color forming bodies into volatile, substantially inert compounds having a relatively low boiling point well below the temperatures normally encountered in condensing phthalic anhydride.

In a preferred embodiment of the invention, an effluent gas stream containing phthalic anhydride, residual molecular oxygen and other impurities, obtained in the course of oxidizing naphthalene or ortho-xylene, is catalytically reacted. Under the catalytic reaction conditions of the invention, such color forming materials as naphthaquinone presumably react with the residual molecular oxygen in the gaseous effluent to form gaseous inert components, for example $CO_2$ and $H_2O$. This is especially suitable in the practice of the present invention since the phthalic anhydride in the resultant effluent gas stream can be condensed as a solid by cooling the gas below approximately 52° C., at which temperature the inerts are still in volatile form and can be suitably removed.

The gas stream to be treated according to the method of the invention may be any phthalic anhydride containing effluent gas stream obtained in the oxidation of naphthalene or ortho-xylene and may have a high or low color forming impurity content. For simplicity, the invention will be described in connection with an effluent gas stream resulting from the catalytic reaction of naphthalene with air, comprising phthalic anhydride, nitrogen, carbon dioxide, molecular oxygen, naphthaquinone and other incidental impurities, although it is to be understood that the invention is limited thereto, but is susceptible of application with other phthalic anhydride bearing gases obtained from sources other than the aforesaid catalytic reaction.

The catalyst to be used in the conversion of color producing compounds such as naphthaquinone in the method of the invention is one containing at least one metal selected from the group consisting of cobalt and manganese. Such catalyst may be used as oxides or other suitable metal containing compounds of cobalt or manganese or as mixtures thereof, depending upon the specific gas to be treated and the particular conditions desired.

In the preferred embodiment of the invention, the catalyst is mounted on a support as by coating it on pellets made of alumina, silicon carbide, pumice or other inert catalyst support.

The ratio of molecular oxygen to color-forming impurities in the gaseous effluent should be such that the molecular oxygen catalytically reacts with substantially all of the color-forming contaminants. For efficiently utilizing the reactivity between molecular oxygen and, for example, naphthaquinone, the amount of oxygen present in the gaseous effluent should be at least in excess of that required for complete stoichiometric reaction with the contained impurities, the excess being always in the volatile form and therefore readily removable.

In practicing the invention, a gaseous effluent resulting from the catalytic reaction of naphthalene with molecular oxygen, such as air, and containing residual oxygen, is introduced into a catalytic chamber where it is passed over a cobalt and/or manganese containing catalyst perferably mounted on an inert catalyst support. Generally, the catalytic reaction of effluent gas is carried out at a temperature in the broad range between 150° C. and 450° C. with a contact time ranging between .01 second and 2.0 seconds. A desirable temperature is between 200 and 400° C. with 250 to 350° C. being preferred. The preferred contact time is approximately .05 to 1.3 seconds. Following the conversion of the color forming impurities, the resultant gas stream is then cooled in a condenser to remove phthalic anhydride in solid form.

The following examples are illustrative of the practice of the invention, and more fully indicate the extent of the purification effect of catalytically reacting a crude phthalic anhydride stream in the gas phase with molecular oxygen prior to condensation in the condenser.

*Example 1*

A typical commerical 78° C. naphthalene stream comprising 1 mole-percent naphthalene is oxidized with air in a tubular converter containing a vanadia catalyst to phthalic anhydride. Effluent gas leaves the converter at 400° C. and is cooled through a heat exchanger to 325° C. The effluent is then passed over a catalyst containing cobalt oxide on a silica gel support maintained at 325° C. for a contact time of .08 second. The effluent is cooled to 42° C. and the condensed crude phthalic anhydride is transferred to a 20 plate distillation column. The heart cut, representing the refined phthalic anhydride, has a Hazen color of 10 and a heat stability on the Hazen scale (1.5 hours residue time at 250° C.) of 25.

In a similar phthalic anhydride bearing effluent stream which is not passed over a catalyst prior to condensation, the initial Hazen color is 80 and the heat stability is 300.

*Example 2*

Example 1 is repeated using as a catalyst manganese dioxide. The Hazen color is 20 and the heat stability is 35. The same procedure, without the employment of a manganese dioxide catalyst, results in a Hazen color of 70 and a heat stability of 225.

The above test results indicate that the combination of catalytically reacting a gaseous phthalic anhydride containing effluent prior to condensation of the phthalic anhydride is admirably suited in substantially lowering the color forming impurities, without any significant carry-over of color forming impurities in the condensed phthalic anhydride. Because of the conversion of the color forming impurities in the gas state to gaseous inerts, the elimination of color forming impurities from the condensed phthalic anhydride is greatly facilitated.

An obvious advantage of the present invention is that it eliminates costly steps in the present day method of purifying phthalic anhydride, involving melting the condensed phthalic anhydride and heating it in a treating tank for several hours and then distilling the liquid phthalic anhydride in a distillation column. The economic advantages of the present invention can be seen when it is realized that the conventional steps involved in the removal of color forming bodies are not reliable and may have to be repeated several times before the color producing impurities have been reduced to within tolerable limits.

It will be understood that modifications and variations may be effected without departing from the spirit and scope of the invention.

What is claimed is:

1. In a process for the production of phthalic anhydride wherein a hydrocarbon selected from the group consisting of naphthalene and ortho-xylene is reacted in the vapor phase with molecular oxygen in the presence of a vanadian catalyst to form a gaseous reaction effluent containing phthalic anhydride and molecular oxygen, the improvement which comprises contacting said effluent in the gas phase with a catalyst selected from the group consisting of cobalt and manganese at a temperature between about 150° C. and 450° C., cooling the effluent from said contact, and condensing substantially pure solid phthalic anhydride from said cooled effluent.

2. The process of claim 1 wherein said effluent is contacted with said catalyst selected from the group consisting of cobalt and manganese for a contact period between 0.01 and 2.0 seconds.

References Cited in the file of this patent

UNITED STATES PATENTS

| | | |
|---|---|---|
| 1,693,915 | Brode et al. | Dec. 4, 1928 |
| 1,953,937 | Jaeger | Apr. 10, 1934 |
| 2,086,507 | Larson | July 6, 1937 |
| 2,117,359 | Porter | May 17, 1938 |
| 2,289,916 | Komarewsky | July 14, 1942 |
| 2,792,436 | Kroeper et al. | May 14, 1957 |
| 2,959,613 | Whitfield | Nov. 8, 1960 |

FOREIGN PATENTS

| | | |
|---|---|---|
| 787,924 | Great Britain | Dec. 18, 1957 |